United States Patent [19]
Chang et al.

[11] Patent Number: 5,879,783
[45] Date of Patent: Mar. 9, 1999

[54] LOW NOISE MAGNETIC RECORDING MEDIUM AND METHOD OF MANUFACTURING

[75] Inventors: Jyh-Kau Chang, Fremont; Qixu Chen, Milpitas; Ga-Lane Chen, Fremont, all of Calif.

[73] Assignee: Seagate Technology, Inc., Scotts Valley, Calif.

[21] Appl. No.: 735,443

[22] Filed: Jan. 2, 1997

Related U.S. Application Data

[60] Provisional application No. 60/023,228 Aug. 5, 1996.
[51] Int. Cl.$^6$ ........................................................ G11B 5/66
[52] U.S. Cl. ...................... 428/141; 428/336; 428/684 T; 428/684 TS; 428/684 TR; 428/684 ST; 428/684 SG; 428/652; 428/900; 427/129; 427/130; 427/131; 360/135; 360/97.01; 204/192.2
[58] Field of Search ........................... 428/684 T, 684 TS, 428/684 TR, 684 ST, 684 SG, 652, 336, 900.41; 360/135, 97.01; 427/128, 130, 131; 204/192.2

[56] References Cited

U.S. PATENT DOCUMENTS

| | | | |
|---|---|---|---|
| 4,900,387 | 2/1990 | Werner | 156/643 |
| 4,900,397 | 2/1990 | Werner | 216/22 |
| 5,273,834 | 12/1993 | Hoover | 428/694 ST |
| 5,302,434 | 4/1994 | Doerner | 428/64 |

OTHER PUBLICATIONS

D.E. Long Win et al. "Epitaxy and Crystallorganic Texture . . . " Material Research Society Symposium, vol. 343, Aug. 1994.

Chen, Qixu, et al, "Thin Film Media With and Without Bicrystal Cluster Structure on Glass Ceramic Substrates," Intermag Conference GC–6, Seattle, 1996 (3 pages.).

Laughlin, David E., et al, "Epitaxy and Crystallographic Texture of Thin Films for Magnetic Recording," *Material Research Society Symposium*, vol. 343, 1994, pp. 327–337.

Ding, Juren, et al, "Fabrication and Recording Performances of Bicrystal Disks on GaAs Substrates," *Journal of the Magnetics Society of Japan*, vol. 18, Supplement No. S1, 1994.

Ding, Juren, et al, "Experimental Study on Recording and Track Edge Characteristics of Bicrystal Thin Film Media," *IEEE Transactions on Magnetics*, MAG–31, 1995, p. 27.

Chen, Tu, "The Micromagnetic Properties of High–Coercivity Metallic Thin Films and Their Effects on the Limit of Packing Density in Digital Recording," *IEEE Transactions on Magnetics*, Mar. 1981, pp. 1181–1191.

Miles, Jim, J., et al, "The Effect of Cluster Size of Thin Film Media Noise," *IEEE Transactions on Magnetics*, Mar. 1995, pp. 1013–1023.

Yahisa, Y., et al, "Electron Spectroscopic Imaging Analysis of Compositional Inhomogeneity in CoCrTa Longitudinal Thin Film Media," *IEEE Transactions on Magnetics*, Nov. 1995, pp. 2836–2838.

Chang, Jack J.K., "Evolution of Bicrystal Media Development," *TMR Conference, Santa Clara, 1996*.

Wong, B.Y., "Investigation of CoNiCr Thin Films Deposited on [100] and [110] Cr Single Crystals," *IEEE Transactions on Magnetics*, Nov. 1991, pp. 4733–4735.

(List continued on next page.)

*Primary Examiner*—Leszek Kiliman
*Attorney, Agent, or Firm*—McDermott, Will & Emery

[57] ABSTRACT

A magnetic recording medium exhibiting low medium noise is formed by depositing a seed layer on a glass or a glass-ceramic substrate and oxidizing the deposited seed layer, under controlled conditions to induce controlled surface microroughness. The subsequently sputter deposited underlayer exhibits a fine average grain size, such as less than about 20 nm. The magnetic alloy sputter deposited and epitaxially grown on the underlayer exhibits a fine average grain size, such as less than about 15 nm, and magnetic clusters reduced in size.

44 Claims, 6 Drawing Sheets

OTHER PUBLICATIONS

Mirzamaani, M., et al, "Magnetic Properties of CoPtCr Thin Films with <1120> Crystal Orientation," *Journal of Applied Physics,* Apr. 15, 1991, pp. 5169–5171.

Min, Tai, et al, "Bicrystal Advanced Thin–film Media for High Density Recording," *Journal of Applied Physics,* May 15, 1994, pp. 6129–6131.

Ding, Juren, et al, "Microstructure and Recording Properties of Bicrystal Disks With GaAs Substrates," *IEEE Transactions on Magnetics,* Nov. 1994, pp. 3978–3980.

Futamoto, Masaki, et al, "Magnetic and Recording Characteristics of Bicrystalline Longitudinal Recording Medium Formed on an MgO Single Crystal Disk Substrate," *IEEE Transactions on Magnetics,* Nov. 1994, pp. 3975–3977.

Ye, Xiao–Guang, et al, "Modeling of Thin–film Media With Advanced Microstructure for Ultrahigh Density Recording," *Journal of Applied Physics,* May 15, 1994, pp. 6135–6137.

Nolan, T. P., et al, "Effect of Microstructural Features on Media Noise in Longitudinal Recording Media," *Journal of Applied Physics,* May 15, 1993, pp. 5566–5568.

Peng, Qingzhi, et al, "Micromagnetic and Experimental Studies of CoPtCr Bicrystal Thin Film Media," *IEEE,* Sep. 1995.

Hosoe, Y., "Bicrystal Cluster Structure and Magnetic Properties of CoCrTa/Cr Thin Film Media," *IEEE,* Sep. 1995.

5,879,783

LOW NOISE MAGNETIC RECORDING MEDIUM AND METHOD OF MANUFACTURING

This application claims priority from provisional application Ser. No. 60/023,228, filed Aug. 5, 1996, entitled "METHOD FOR FABRICATING HIGH PERFORMANCE METALLIC THIN FILM MAGNETIC RECORDING DISKS ON ALTERNATIVE SUBSTRATES," the entire disclosure of which is hereby incorporated herein by reference.

TECHNICAL FIELD

The present invention relates to a magnetic recording medium, such as a thin film magnetic recording disk, and to a method of manufacturing the medium. The invention has particular applicability to a magnetic recording medium exhibiting low noise, high coercivity and high areal recording density.

BACKGROUND ART

The requirements for high areal recording density impose increasingly greater requirements on thin film magnetic recording media in terms of coercivity, magnetic remanence (Mr), coercivity squareness (S*), low medium noise and narrow track recording performance. It is extremely difficult to produce a magnetic recording medium satisfying such demanding requirements, particularly a high areal recording density magnetic rigid disk medium for longitudinal recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives and, hence, has become a road barrier to ultra-high areal density recording. Medium noise in thin films is attributed primarily to inhomogeneous grain size and intergranular exchange coupling among magnetic grains. Therefore, in order to increase linear density, medium noise must be minimized by suitable microstructure control.

A conventional longitudinal recording disk medium is depicted in FIG. 1 and typically comprises a non-magnetic substrate 10 having sequentially deposited thereon a plating 11, such as a plating of amorphous nickel-phosphorous (NiP), and underlayer 12, such as chromium (Cr) or a Cr-alloy, a magnetic layer 13, typically comprising a cobalt (Co)-based alloy, and a protective overcoat 14, typically containing carbon. Conventional practices also comprise bonding a lubricant topcoat (not shown) to the protective overcoat. Underlayer 12, magnetic layer 13 and protective overcoat 14 are typically deposited by sputtering techniques. The Co-base alloy magnetic layer deposited by conventional techniques normally comprises polycrystallites epitaxially grown on the polycrystal Cr or Cr-alloy underlayer.

A substrate material conventionally employed in producing magnetic recording rigid disks comprises an aluminum-magnesium (Al-Mg) alloy. Such Al-Mg alloys are typically electrolessly plated with a layer of NiP at a thickness of about 15 microns to increase the hardness of the substrates, thereby providing a suitable surface for polishing to provide the requisite surface roughness or texture.

Werner et al., U.S. Pat. No. 4,900,397, proposed the use of Radio Frequency (RF) sputter etching to remove surface deposits on a conventional NiP coating of Al-alloy substrates, followed by oxidization, to improve adhesion of a Cr underlayer. Doerner et al., U.S. Pat. No. 5,302,434, found it difficult to obtain high coercivity on superpolished untextured NiP coated substrates, and proposed annealing in air to form a nickel oxide film on the surface of the NiP coating for enhanced coercivity. The smooth surface of the polished NiP layer was maintained through subsequent layers. The nickel oxide film was also said to reduce modulation by altering the crystallographic orientation of the underlayer and magnetic layer. Aluminum alloy substrates of magnetic recording disks exhibit an undesirable tendency to warp into potato chip shape when very thin disks are formed to satisfy increasing demands for reducing the physical size of disk drives, especially for portable computers. Such warping adversely affects control of spacing between the disk and transducer head. Moreover, aluminum alloy substrates do not possess sufficient hardness to satisfy current disk drive shock impact requirements.

Alternate substrate materials have been employed for magnetic recording media, such as glasses, e.g., an amorphous glass, and glass-ceramic materials which comprise a mixture of amorphous and crystalline phases. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834.

Conventional methods for manufacturing a magnetic recording medium with a glass or glass-ceramic substrate comprise applying a seed layer between the substrate and underlayer. Such magnetic recording media with glass or glass-ceramic substrates are commercially available from different manufacturers with different seed layer materials to reduce the high thermal emissivity of such glass and glass-ceramic substrates, and to influence the crystallographic orientation of subsequently deposited underlayers and magnetic layers. Such conventional seed layer materials also include NiP which is typically sputter deposited on the surface of the glass or glass-ceramic substrate at a thickness of about 500 Å.

Conventional magnetic recording media comprising a glass or glass-ceramic substrate having NiP sputter thereon also comprise, sequentially deposited thereon, a Cr or Cr-alloy underlayer at an appropriate thickness, e.g., about 550 Å, a magnetic layer such as Co-Cr-platinum (Pt)-tantalum (Ta) at an appropriate thickness, e.g., about 350 Å, and a protective carbon overcoat at an appropriate thickness, e.g., about 150 Å. Conventional Cr-alloy underlayers comprise vanadium (V) or titanium (Ti). Other conventional magnetic layers are CoCrTa, CoCrPtB, CoCrPt and CoNiCr. The seed layer, underlayer, and magnetic layer are conventionally sequentially sputter deposited on the glass or glass-ceramic substrate in an inert gas atmosphere, such as an atmosphere of pure argon. A conventional protective carbon overcoat is typically deposited in a mixture of argon with nitrogen, hydrogen or ethylene. Conventional lubricant topcoats are typically about 200 Å thick.

Magnetic films exhibiting a bicrystal cluster microstructure are expected to exhibit high coercivity, low noise and high remanent squareness. In co-pending application Ser. No. 08/586,571, filed on Jan. 16, 1996, a magnetic recording medium is disclosed comprising a glass or glass-ceramic substrate and a magnetic layer exhibiting a bicrystal cluster microstructure. The formation of a bicrystal cluster microstructure is induced by oxidizing the surface of a seed layer so that the underlayer subsequently deposited thereon exhibits a (200) crystallographic orientation which, in turn, induces a bicrystal cluster microstructure in a magnetic alloy layer deposited and epitaxially grown on the underlayer.

Co-pending application Ser. No. 08/586,529, filed on Jan. 16, 1996, now U.S. Pat. No. 5,733,370 discloses a method of manufacturing a magnetic recording medium comprising a glass or glass-ceramic substrate and a magnetic layer exhibiting a bicrystal cluster microstructure. The disclosed method comprises sputter depositing an NiP seed layer on a glass or glass-ceramic substrate and subsequently oxidizing the deposited NiP seed layer. The oxidized upper seed layer surface induces the subsequently deposited underlayer to exhibit a (200) crystallographic orientation which, in turn, induces the magnetic alloy layer deposited and epitaxially grown on the underlayer to exhibit a bicrystal cluster microstructure. The magnetic recording media disclosed in co-pending application Ser. Nos. 08/586,571 and 08/586,529 now U.S. Pat. No. 5,733,370 exhibit high coercivity, low Mrt and low noise, thereby rendering them particularly suitable for longitudinal recording. In copending application Ser. No. 08/699,759, a method is disclosed for manufacturing a magnetic recording medium wherein a partially oxidized seed layer is deposited on a glass or glass-ceramic substrate. The subsequently deposited Cr or Cr-alloy underlayer thereon exhibits a (200) dominant crystallographic orientation. The entire disclosures of co-pending application Ser. Nos. 08/586,571, 08/586,529 and 08/699,759 are incorporated by reference herein.

There exists, however, a need for a magnetic rigid disk media for longitudinal recording exhibiting low medium noise and high coercivity, and for an efficient, cost-effective method of manufacturing such magnetic recording media with high production throughput.

DISCLOSURE OF THE INVENTION

An object of the present invention is a magnetic recording medium exhibiting low noise, high coercivity, and high areal recording density.

Another object of the present invention is a method of manufacturing a magnetic recording medium exhibiting low noise, high coercivity, and high areal recording density.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising: a substrate comprising a glass or a glass-ceramic material; a seed layer on the substrate, said seed layer having a roughened upper surface; an underlayer on the roughened upper surface of the seed layer; and a magnetic layer on the underlayer; wherein, the underlayer has an average grain size less than about 20 nm.

Another aspect of the present invention is a magnetic recording medium comprising: a substrate comprising a glass or glass-ceramic material; a seed layer on the substrate, said seed layer having a roughened upper surface; an underlayer on the roughened upper surface of the seed layer; and a magnetic layer on the underlayer; wherein the roughness of the seed layer surface has a peak-to-peak amplitude of about 5 Å to about 100 Å and a wavelength of about 5 Å to about 100 Å.

A further aspect of the present invention is a method of manufacturing a magnetic recording medium, which method comprises: depositing a seed layer on a substrate comprising a glass or glass-ceramic material; roughening a surface of the seed layer; depositing an underlayer on the roughened surface of the seed layer so that the underlayer has an average grain size less than about 20 nm.

Another aspect of the present invention is a method of manufacturing a magnetic recording medium, which method comprises: depositing seed layer on a substrate comprising a glass or glass-ceramic material; roughening a surface of the seed layer so that the surface roughness has a peak-to-peak amplitude of about 5 Å to about 100 Å and a wavelength of about 5 Å to about 100 Å; depositing an underlayer on the roughened surface of the seed layer; and depositing a magnetic layer on the underlayer.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
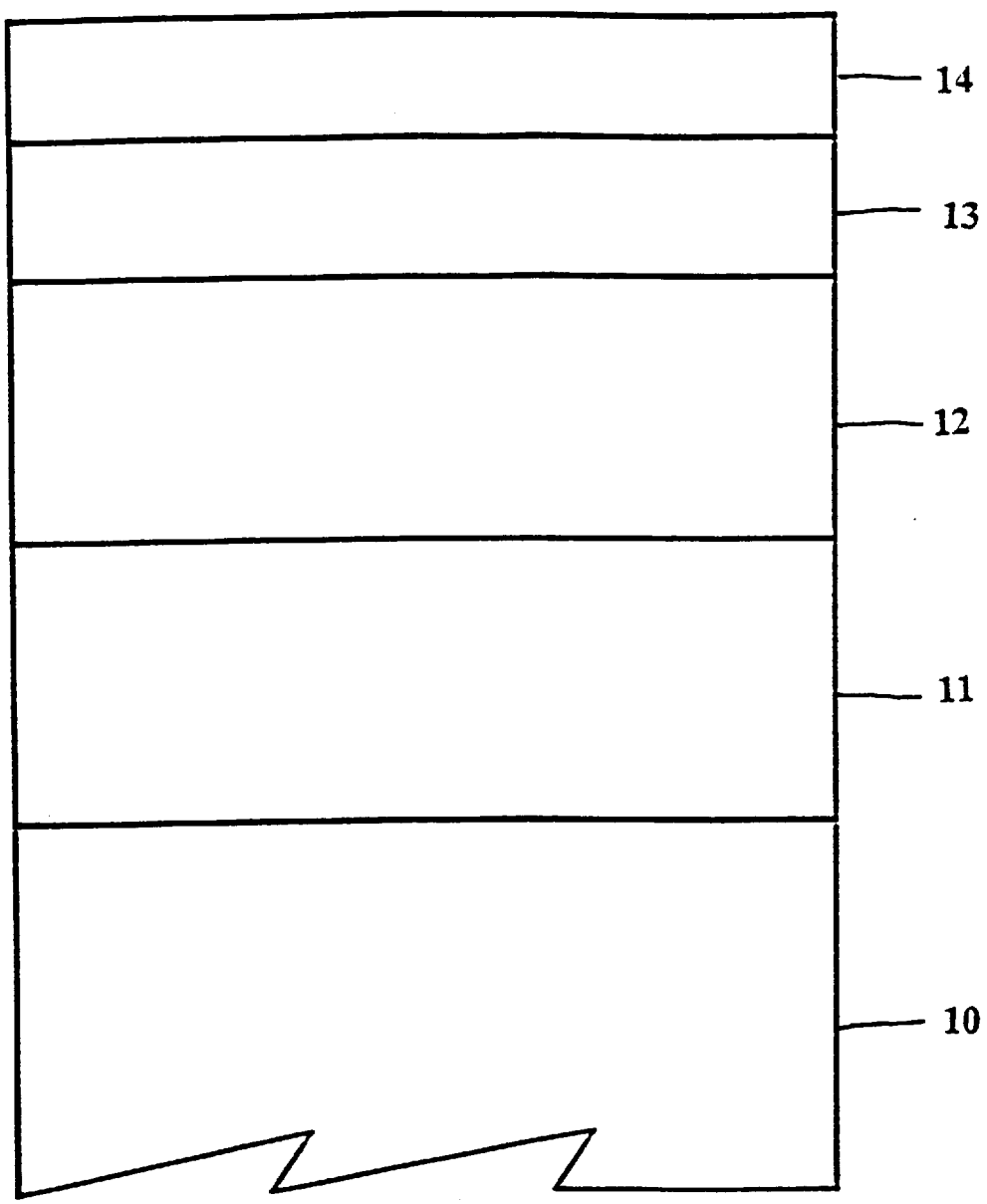
FIG. 1 schematically depicts a conventional magnetic recording medium structure.

It was previously believed that the oxidation of a seed layer on a glass or glass-ceramic substrate induced the subsequently deposited underlayer to exhibit a (200) crystallographic orientation which in turn induced the subsequently deposited epitaxially grown magnetic layer thereon to exhibit a bicrystal cluster microstructure which, in turn, was responsible for and directly resulted in low medium noise. See co-pending applications Ser. Nos. 08/586,571 and 08/586,529, now U.S. Pat. No. 5,733,570. It has also been reported that the microroughness of a sputtered NiP layer on a glass-ceramic substrate would induce the subsequently deposited Cr underlayer to exhibit a (200) crystallographic orientation resulting in the formation of a bicrystal cluster structure in the magnetic layer. Chen et al. Intermag Conference GC-6, Seattle, 1996. It has also been suggested that the Cr (200) texture may develop during the nucleation stage of the Cr underlayer due to a large surface energy difference between the Cr underlayer and the underlying substrate. Laughlin et al., MRS Proceedings, 343, 327–337, 1995.

A bicrystal cluster microstructure is characterized by clusters of multiple magnetic crystallites, each cluster epitaxially grown on a single grain of an underlayer. In bicrystal cluster layers, polycrystal magnetic alloyed layers exhibit a preferred orientation. In employing a Co-based alloy, (11.0) planes exhibit a preference for alignment parallel to the layer plane. In each cluster, the C axes of Co-based alloy subgrains lie along two orthogonal directions. The C axes of subgrains of different clusters are randomly distributed in the film plane. See Ding et al., "Fabrication and Recording Performances of Bicrystal Disks on GaAs Substrates," Journal of The Magnetics Society of Japan, Vol. 18, Supplement, No. S1 (1994) and Ding et al, "Experimental Study on Recording and Track Edge Characteristics of Bicrystal Thin Film Media", IEEE Trans. MAGN. MAG-31, page 27, 1995.

After extensive investigations and experimentations, however, it was discovered that it is not necessary to induce epitaxial growth of a magnetic layer exhibiting a bicrystal cluster microstructure or even a predominantly bicrystal cluster microstructure. The expression "predominantly bicrystal cluster microstructure", as employed in this disclosure, denotes that the magnetic layer has a microstructure which comprises greater than about 50% volume of bicrystal clusters.

Upon further experimentation and investigation, it was discovered that medium noise can be reduced by reducing the grain size of the underlayer, typically Cr or a Cr-alloy, and by increasing the uniformity of the grains in the underlayer, i.e., improved crystallographic morphological uniformity, aside from introducing the bicrystal cluster structure. During subsequent experimentation and investigation, it was discovered that the underlayer grain size and uniformity can be controlled by controlling the microroughness of the seed layer surface on which the underlayer is deposited. By controlling the microroughness of the seed layer surface to reduce the grain size and increase the uniformity of the crystallographic morphology of the chromium underlayer, the grain size and magnetic cluster size of the magnetic layer deposited on the underlayer are also reduced, thereby reducing medium noise. It was found, that reducing the grain size and magnetic cluster size of the magnetic layer provided a significant reduction in medium noise even without growing a magnetic layer exhibiting a bicrystal cluster microstructure, or even a predominantly bicrystal cluster microstructure. Thus, the present invention also encompasses growth of a magnetic layer having a microstructure comprising less than about 50% by volume of bicrystal clusters.

In accordance with the inventive method, the microroughness of a deposited seed layer, preferably a sputter deposited seed layer, is controlled to reduce the grain size of an underlayer deposited thereon and to increase the uniformity of its crystallographic morphology. The resulting magnetic layer sputtered deposited and epitaxial grown on the underlayer also exhibits a reduced grain and magnetic cluster sizes and significantly reduced medium noise. Given the disclosed objectives, one having ordinary skill in the art can easily determine the optimum surface roughness of a deposited seed layer, the optimum grain size of the underlayer, and the optimum grain and magnetic cluster sizes of the magnetic layer to achieve a desired reduction in medium noise. For example, it has been suitable to control the microroughness of a sputter deposited seed layer, such as an NiP layer, so that a Cr underlayer sputter deposited thereon has an average grain size less than about 20 nm. A Co-base magnetic layer epitaxially grown thereon would typically exhibit a fine grain microstructure wherein the average grain size is less about 15 nm, e.g. less than about 10 nm.

It has further been found that the foregoing objectives can be achieved by controlling the microroughness of a sputter deposited NiP underlayer so that the surface roughness has a peak-to-peak amplitude of about 5 Å to about 100 Å, e.g. about 5 Å to about 50 Å, and a wavelength of about 5 Å to about 100 Å, e.g., about 5 Å to about 50 Å.

Thus, according to the present invention, the microroughness of the seed layer is controlled to reduce the grain size in both the subsequentially sputter deposited underlayer and magnetic layer such that medium noise is significantly reduced thereby increasing areal recording density by about 40% or more. This objective is surprisingly achieved even though the microstructure of the magnetic layer comprises less than about 50% by volume of bicrystal clusters e.g. less than about 25% by volume of bicrystal clusters, even less than about 15% by volume of bicrystal clusters.

In an embodiment of the present invention, the microroughness of the seed layer surface is induced and controlled by oxidation. In an aspect of this embodiment, a seed layer is initially sputtered deposited on a glass or glass-ceramic substrate, and the surface of the sputter deposited seed layer, e.g., NiP layer, is roughened by oxidation. The seed layer surface can be oxidized by heating the sputter deposited seed layer in an atmosphere containing about 1% to about 100% oxygen by volume, at a temperature above about room temperature, i.e., above about 25° C., such as up to about 300° C., to effect a desired degree of oxidation induced microroughness in the seed layer surface. One having ordinary skill in the art can easily determine the optimum time, duration of oxidation, temperature and amount of oxygen in the oxidizing atmosphere to induce an optimum degree of microroughness to control the grain size and crystallographic morphology of the subsequently deposited underlayer.

Figure 2:
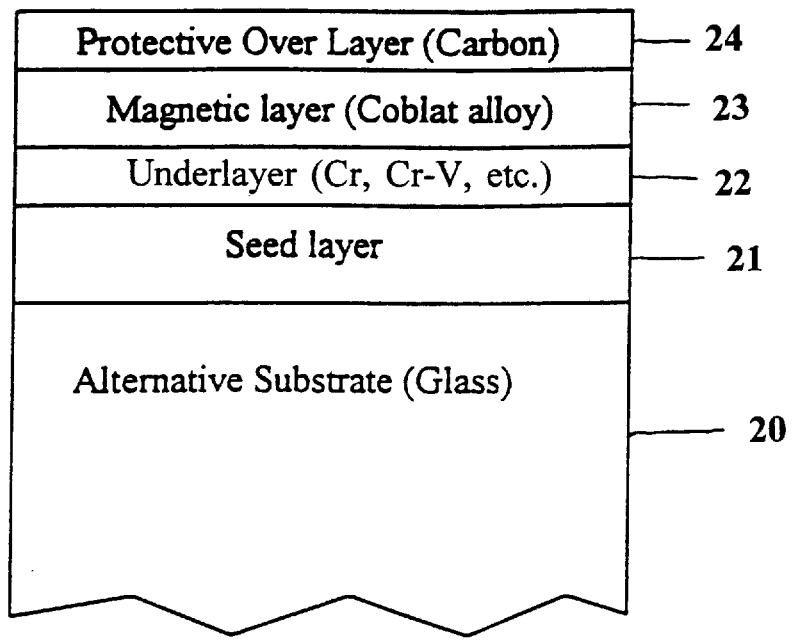
FIG. 2 schematically depicts a magnetic recording medium structure in accordance with the present invention.

A magnetic recording medium in accordance with present invention is shown in FIG. 2, and comprises a glass or glass-ceramic substrate 20 having sputter deposited thereon seed layer 21. The surface of seed layer is intentionally microroughened, as by oxidation. Underlayer 22, magnetic layer 23, and protective overcoat 24, are sequentially deposited on the seed layer.

Figure 3A:
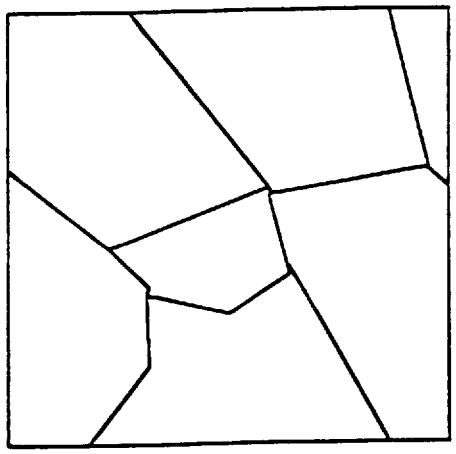
FIG. 3A schematically illustrates the microstructure of an underlayer deposited on a smooth surface seed layer.
Figure 3B:
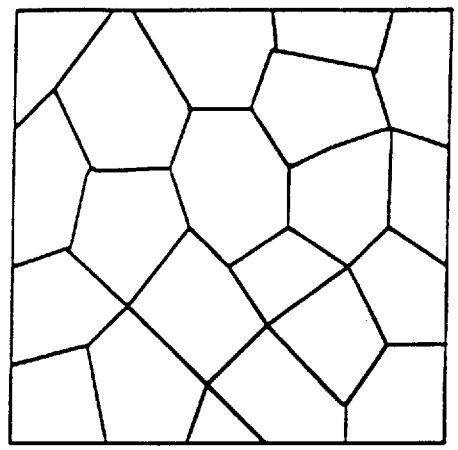
FIG. 3B schematically illustrates the microstructure of an underlayer deposited on a microroughened surface seed layer in accordance with the present invention.
Figure 3C:
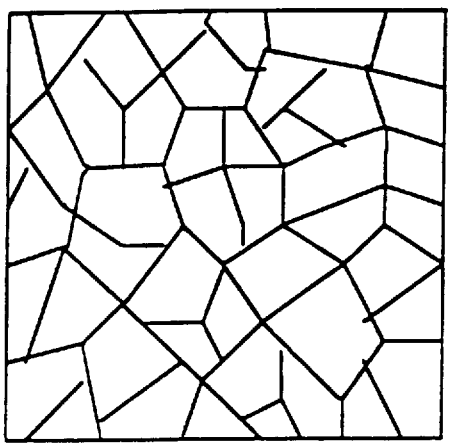
FIG. 3C schematically illustrates the microstructure of a magnetic layer deposited on the underlayer illustrated in FIG. 3A.
Figure 3D:
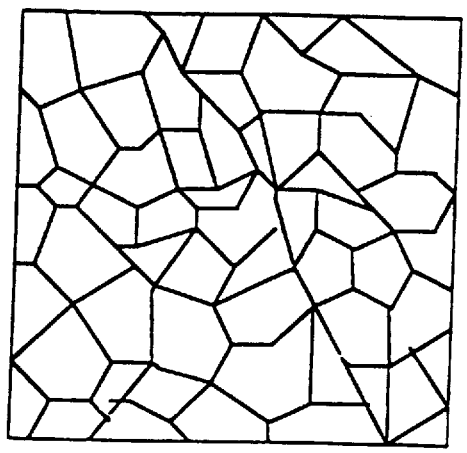
FIG. 3D schematically illustrates the microstructure of a magnetic layer deposited on the underlayer illustrated in FIG. 3B.

The advantageous reduction of the grain size of a Cr underlayer and a Co-based magnetic alloy sequentially sputter deposited on an NiP seed layer with an oxidation induced microroughened upper surface is illustrated in FIGS. 3A–3D. FIG. 3A illustrates the grain size of a Cr layer deposited on a smooth NiP seed layer which has not been oxidized to induce surface microroughness. FIG. 3B illustrates the microstructure of a Cr underlayer deposited on an oxidation induced microroughened NiP seed layer in accordance with the present invention. FIG. 3C illustrates the microstructure of a Co-base magnetic alloy sputter deposited on the Cr underlayer of FIG. 3A deposited on a smooth NiP seed layer. FIG. 3D illustrates the microstructure of a Co-base magnetic alloy sputter deposited on the Cr underlayer shown in FIG. 3B deposited on an oxidation induced microroughened NiP seed layer in accordance with the present invention. It should be apparent from FIGS. 3A–3D that the oxidation induced microroughened seed layer surface advantageously reduces the grain size of the subsequently sequentially deposited underlayer and magnetic layer.

Figure 4:
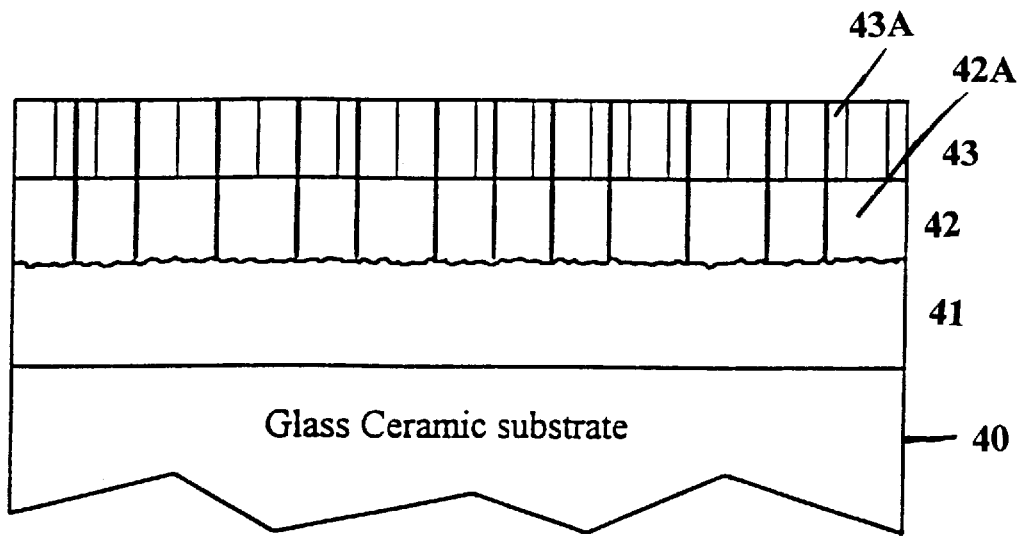
FIG. 4 illustrates a cross sectional view of a magnetic recording medium in accordance with the present invention.

As shown in FIG. 4, a magnetic recording medium produced in accordance with the present invention comprises glass-ceramic substrate 40 with an oxidized NiP seed layer 41 thereon. As a result of the seed layer surface microroughness, the subsequently deposited Cr underlayer 42 exhibits a relatively fine grain size which in turn, induces the subsequently deposited magnetic cobalt alloy magnetic layer 43 to exhibit a relatively fine grain size and relatively small magnetic clusters.

Figure 5:
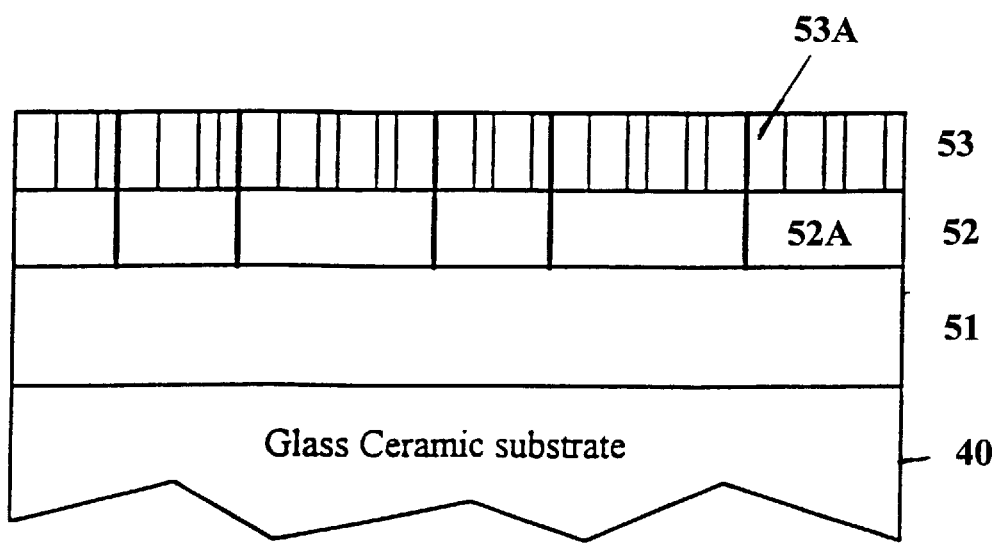
FIG. 5 illustrates a cross sectional view of the magnetic recording medium of FIG. 3C.

In comparison, as shown in FIG. 5, the NiP sputter deposited seed layer 51 formed on glass-ceramic substrate 40 is not oxidized, i.e. it has a relatively smooth upper surface. The subsequently sputter deposited Cr underlayer 52, consequently, exhibits a grain size which is relatively larger, and a crystallographic morphology less uniform, than those of Cr layer 42 of FIG. 4 which was sputter deposited on a microroughened seed layer surface. The subsequently deposited Co-base magnetic layer 53 shown in FIG. 5, consequently, exhibits a grain size and magnetic clusters larger than the grain size and magnetic clusters of Co alloy magnetic layer 43 of the present invention illustrated in FIG. 4.

A comparison of FIGS. 4 and 5 further illustrates that for a relatively large Cr underlayer (52) grain size, several Co-alloy grains grow on a single Cr grain to form a magnetic cluster larger than those formed in magnetic layer 43 on a single Cr grain of Cr underlayer (42) in accordance with the present invention illustrated in FIG. 4. Thus, the relatively smaller grain size of Cr underlayer 42 of FIG. 4 induces the growth very few Co-alloy grains on a single Cr grain and hence, smaller magnetic clusters are formed vis-a-vis magnetic layer 53 of FIG. 5.

The origin of media noise stems from the irregular shape of transitions due to finite magnetic cluster size. See Tu Chen, "The Micromagnetic Properties of High-Coercivity Metallic Thin Films and Their Effects on the Limit of Packing Density in Digital Recording," IEEE Trans. Magn. Vol. MAG-17, pp. 1181–1191, 1981. The magnetic cluster is related to the grain size of the Cr underlayer. See J. J. Miles et al., IEEE Trans. Magn., Vol. MAG-31, p. 1013, 1995. In this case, more Co alloy subgrains are grown on a Cr underlayer grain, which results in a larger magnetic cluster through strong inner intergranular exchange coupling. The outer intergranular exchange coupling is relatively weak due to Cr segregation at boundaries between clusters. See Y. Yahisa et al., "Electron Spectroscopic Imaging Analysis of Compositional Inhomogeneity in CoCrTa Longitudinal Thin Film Media," IEEE Trans. Magn., 31, 2836, 1995. The magnetic cluster is the smallest switching volume during a magnetization reversal process. Therefore, transition follows the boundaries of magnetic clusters. A smaller magnetic cluster has less variance of transition, which results in low media noise; whereas, a larger magnetic cluster has more variance of transition which leads to high media noise. See J. J. Miles et al., IEEE Trans. Magn., Vol. MAG-31, p. 1013, 1995, J. K. Chang et al., "Evolution of Bicrystal Media" TMR conference, Santa Clara, 1996.

Figure 6:
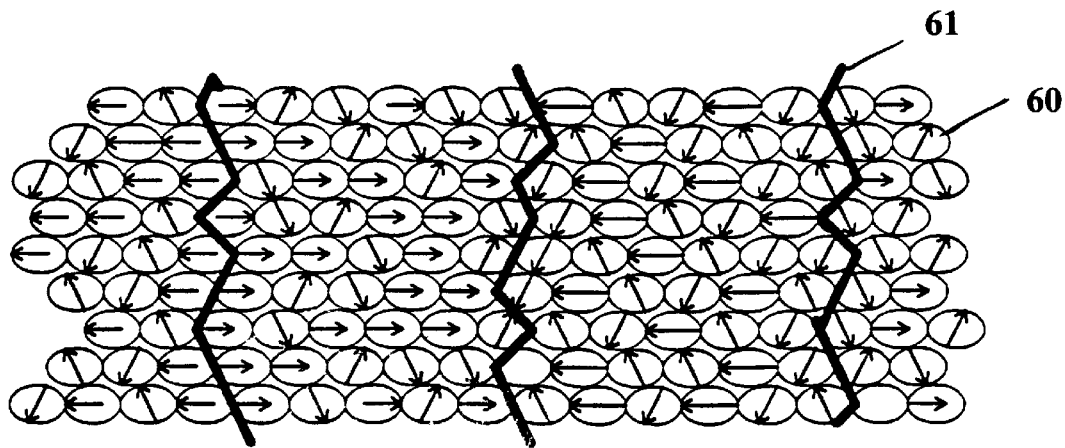
FIG. 6 illustrates magnetic clusters of a magnetic recording medium in accordance with the present invention.
Figure 7:
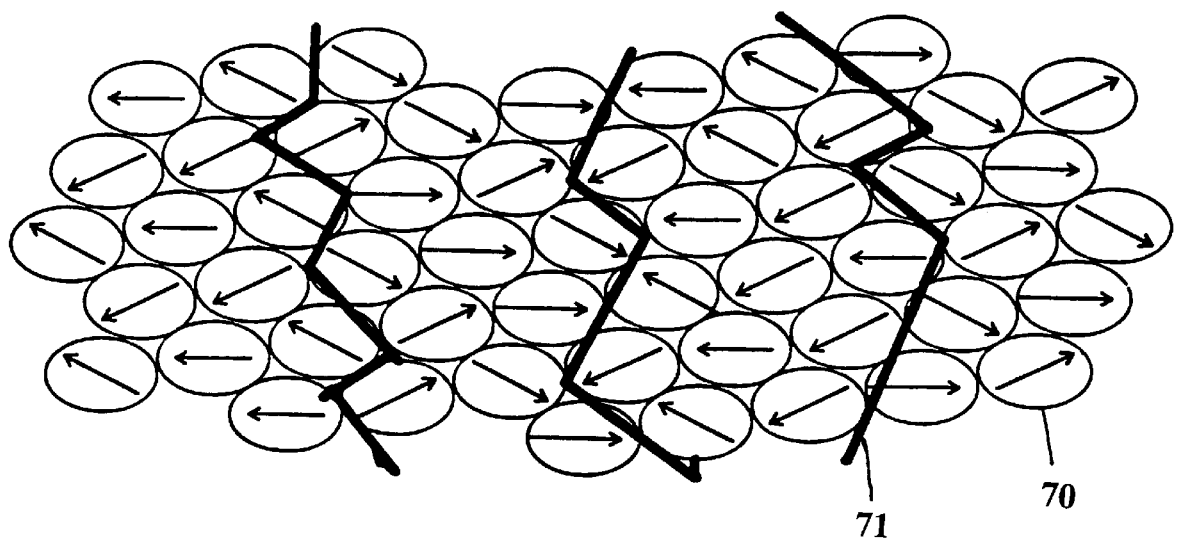
FIG. 7 illustrates the relatively larger magnetic clusters of the FIG. 5 magnetic recording medium.

FIG. 6 illustrates the microstructure of a magnetic layer formed in accordance with the present invention having magnetic clusters 60 which are smaller than magnetic clusters 70 formed on an underlayer deposited on a seed layer with a relatively smooth upper surface, as shown in FIG. 7. It is apparent from a comparison of FIGS. 6 and 7, that the magnetic orientation transition shape 61 across the magnetic cluster 60 in accordance with the present invention illustrated in FIG. 6 has greater regularity and uniformity than the transition shape 71 across the relatively larger magnetic clusters 70 illustrated in FIG. 7.

EXAMPLE

A glass-ceramic substrate was preheated to a temperature of about 250° C., and an NiP seed layer was sputtered deposited thereon at a pressure of about 10 mTorr. After sputter deposition, the NiP seed layer was exposed to an atmosphere containing argon and about 20 volume percent oxygen at a temperature in excess of 100° C. to induce a desired surface microroughness. Subsequently, a Cr underlayer, CoCrPtTa magnetic layer and protective carbon overcoat were sequentially sputtered deposited at a working pressure of about 10 mTorr and a temperature of about 150° C. to about 250° C. The resulting magnetic recording medium representative of the present invention is identified as Sample B. For comparison, a magnetic recording medium identified as Sample A was fabricated in an identical manner as Sample B except that the sputtered deposited NiP seed layer was not oxidized to induce surface microroughness.

In Table 1 below, the process conditions employed to produce Samples A and B are set forth.

TABLE I

| Sample | Pressure | Temp. (Cr-Underlayer) | Temp. (Magnetic Layer) | NiP |
|---|---|---|---|---|
| A | 10 mTorr | 250° C. | 200° C. | No Oxidation |
| B | 10 mTorr | 250° C. | 200° C. | Oxidation |

The grain size and microroughness were determined employing a Philip 430 electron microscope operating at 300 kV. High resolution transmission electron microscope (HRTEM) images of the interface between the Cr and NiP layers confirmed the formation of seed layer surface microroughness upon oxidation in Sample B; however, no such microroughness was apparent from the HRTEM image of Sample A. In addition, it was observed that the grains of the Cr underlayer deposited on the oxidized NiP seed layer of Sample B were significantly smaller and exhibited greater uniformity than the grains of the Cr underlayer deposited on the smooth seed layer of Sample A. HRTEM images also revealed that the larger Cr grains of Sample A contained more Co-alloy grains per Cr grain than the smaller Cr grains of Sample B. In comparing Samples A and B, the grain size of the Cr underlayer of Sample A was about 20 nm to about 40 nm, while the grain size of the CoCrPtTa magnetic layer ranged from about 5 nm to about 20 nm. In Sample B however, the Cr grain size ranged from about 5 n to about 20 nm, while the grain size the CoCrPtTa magnetic layer ranged from about 3 nm to about 10 nm.

The magnetic transition shape was observed by employing a magnetic force microscope to form images of written magnetization bits patterned at 100 Kfci on Samples A and B. It was observed that the medium with the smooth layer (Sample A) has a magnetic orientation transition shape with significantly greater irregularity than that of the magnetic recording medium with the rough seed layer (Sample B).

The magnetic properties of the Samples A and B were measured using a vibrating sample magnetometer. The recording performance of the Samples were evaluated on a Guzik 1701 spinstand through a Guzik 1601 read-write analyzer. An inductive head with a write track width of 2.9 μm and gap length of 0.5 μm were employed in the writing process. For playback, a magnetoresistive head with a read track width of 2.4 μm and shield spacing of 0.35 μm was used. The head medium spacing was 1.8 μin. The medium transition noise was measured by integrating the power spectrum over a bandwidth of 70 MHz and subtracting off the DC and electronics noise. The magnetic properties and recording results at 100 Kfci for Samples A and B are listed in Table II.

TABLE II

| Sample | Hc (Oe) | Mrt (emu/cm$^2$) | S* | S | PW50 (ns) | OW (db) | SNR (db) |
|---|---|---|---|---|---|---|---|
| A | 2330 | 0.98 | 0.83 | 0.78 | 26.1 | 37.3 | 14.5 |
| B | 2109 | 0.96 | 0.83 | 0.81 | 25.7 | 42.3 | 20.7 |

In Table II, SNR denotes the signal-to-noise ratio; OW denotes overwrite; and PW50 denotes the pulse width at half maximum of the signal output. It is apparent from Table II that Sample B fabricated in accordance with the present invention exhibits an SNR of greater than 6 dB, and superior OW, than Sample A prepared without inducing microroughness in the seed layer surface.

Figure 8:
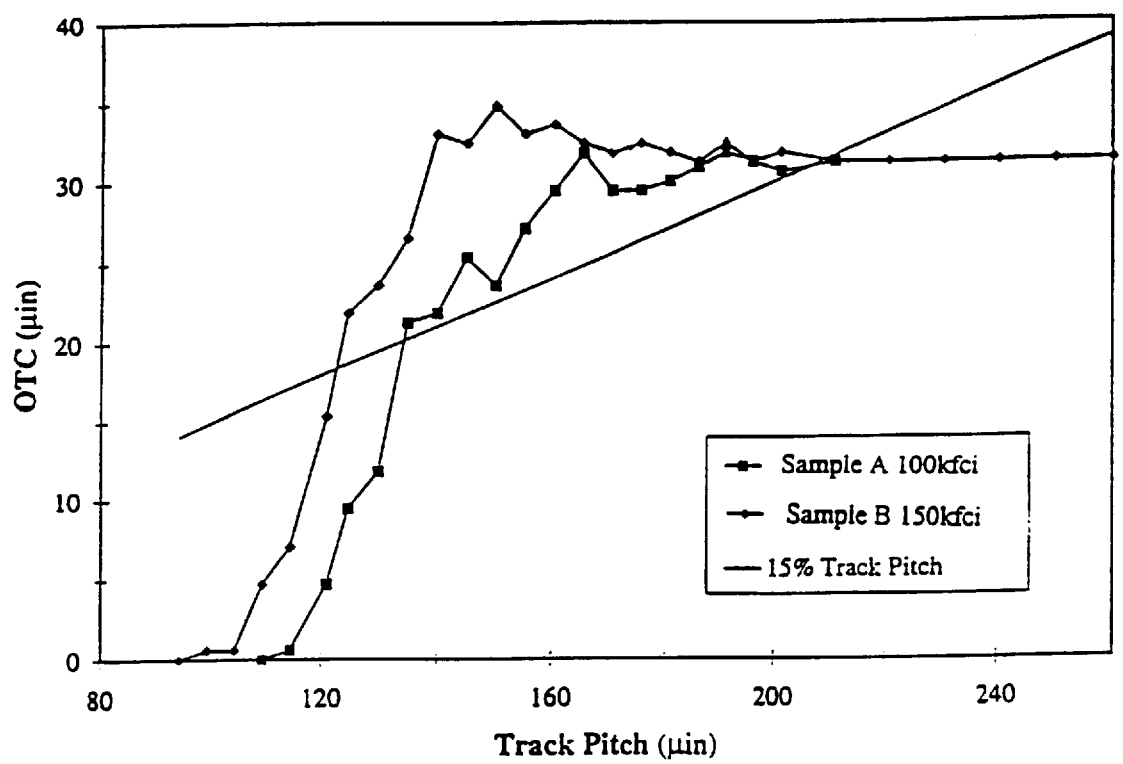
FIG. 8 is a graph illustrating the off-track capability vs. track pitch of an embodiment of the present invention.

The track density was determined by off-track-capability (OTC) measurements. FIG. 8 shows the OTC capability vs. track pitch for Samples A and B. The bit error rate for the OTC test is 10$^{-8}$. The minimum track pitch is 134 μin for Sample A and 122 μin for Sample B. Table III, set forth below, summarizes the areal density for both Sample A and B. It should be apparent that the areal density for Sample B is about 40% higher than that for Sample A.

TABLE III

| Sample | kfci | KBPI | Min. Track pitch (μin) | TPI | Areal density (Gb/in$^2$) |
|---|---|---|---|---|---|
| A | 100 | 88.9 | 134.0 | 7500 | 0.67 |
| B | 150 | 133.3 | 121.6 | 8200 | 1.09 |

Accordingly, the present invention comprises a magnetic recording medium having a significantly improved SNR by virtue controlling the surface roughness of a seed layer, as by controlling the oxidation of its surface subsequent to sputter deposition on a glass or glass-ceramic substrate. The subsequently deposited Cr or Cr-alloy underlayer exhibits a fine grain size and uniform crystallographic morphology. The magnetic recording medium of the present invention advantageously exhibit significantly reduced medium noise vis-à-vis magnetic recording media with glass or glass-ceramic substrates produced without controlling the microroughness of the seed layer deposited on the substrate. The magnetic recording media of the present invention also exhibit a high coercivity even at a low Mrt and, hence, are particularly suitable for high areal density magnetic recording.

The substrates employed in the present invention can advantageously comprise any of various glass or glass-ceramic materials, such as those previously been employed as substrates for magnetic recording media. Glass-ceramic materials are typically formed by a heat treatment of the surface to form a thin crystallized layer of ceramic thereon. Some forms of suitable conventional glass-ceramic material are referred to as "Ohara glass."

The underlayer employed in the present invention can comprise any of various materials conventionally employed as an underlayer in the production of magnetic recording media, such as Cr, CrV, CrTi or CrMo. It has been found that an underlayer thickness of about 100 Å to about 2000 Å, such as about 550 Å, is suitable.

The magnetic layer of the present invention can comprise any magnetic alloy conventionally employed in the production of magnetic recording media. Such alloys include, but are not limited to, Co-based alloys such as CoCr, CoCrTa, CoNiCr, CoCrPtTa, CoCrPt, CoNiPt, CoNiCrPt and CoCrPtB. The thickness of the magnetic layer is consistent with the thickness of magnetic layers of conventional magnetic recording media. A Co-base alloy having a thickness of about 100 Å to about 1000 Å, such as about 200 Å to 500 Å, has been found suitable.

As in conventional magnetic recording media, a protective overcoat can be deposited on the magnetic layer by any conventional means, such as sputtering. Protective overcoats can comprise zirconium oxide ($ZrO_2$), carbon, including hydrogenated carbon, silicon carbide (SiC), or a carbon nitride (CN). The protective overcoat is provided in a thickness suitable to protect the underlying layers. An overcoat having a thickness of about 50 Å to about 300 Å, such as about 100 Å to 200 Å has been found suitable.

As in conventional magnetic recording media, a layer of a lubricant can be applied on and bonded to the overcoat. The lubricant topcoat can be provided in any suitable thickness. A lubricant thickness of about 5 Å to 50 Å, such as about 10 Å to about 20 Å, has been found suitable.

The magnetic recording media produced in accordance with the present invention typically exhibit a coercivity greater than 2000 Oersteds and an Mrt of about 0.4 to about 3.0 memu/cm$^2$. The apparatus employed in the present invention can be any of those sputtering apparatus conventionally employed in the production of magnetic recording medium.

The present invention is not limited to the specific examples disclosed herein, the particular deposition techniques or the particular materials previously exemplified or mentioned. For example, the seed layer can be deposited by any of various electrical plating techniques as an alternative to sputter deposition. The magnetic recording media of the present invention can comprise any of various types of glass, glass-ceramic, carbon and ceramic substrates, and various types of magnetic alloy layers, including various Co-based alloy magnetic layers. The underlayer of the present magnetic recording media is not limited to Cr, but can comprise various other materials, including metals exhibiting a cubic polycrystal structure. The magnetic recording media of the present invention enjoy utility in various applications, particularly applications wherein high density is required, such as a magnetic rigid disk medium for longitudinal recording.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A magnetic recording medium comprising:
   a substrate comprising a glass or a glass-ceramic material;
   a seed layer on the substrate, said seed layer having a roughened upper surface;

an underlayer on the roughened upper surface of the seed layer; and a magnetic layer on the underlayer; wherein the underlayer has an average grain size less than about 20 nm.

2. The magnetic recording medium according to claim 1, wherein the upper surface of the seed layer is oxidized.

3. The magnetic recording medium according to claim 2, wherein the magnetic layer has an average grain size less than about 15 nm.

4. The magnetic recording medium according to claim 3, wherein the magnetic layer has an average grain size less than about 10 nm.

5. The magnetic recording medium according to claim 2, wherein the roughness of the seed layer surface has a peak to peak amplitude of about 5 Å to about 100 Å and a wavelength of about 5 Å to about 100 Å.

6. The magnetic recording medium according to claim 5, wherein the roughness of the seed layer surface has a peak to peak amplitude of about 5 Å to about 50 Å and a wavelength of about 5 Å to about 50 Å.

7. The magnetic recording medium according to claim 2, wherein the microstructure of the magnetic layer comprises less than about 50% bicrystal clusters.

8. The magnetic recording medium according to claim 7, wherein the microstructure of the magnetic layer comprises less than about 25% bicrystal clusters.

9. The magnetic recording medium according to claim 8, wherein the microstructure of the magnetic layer comprises less than about 15% bicrystal clusters.

10. The magnetic recording medium according to claim 2, wherein the seed layer comprises a material selected from the group consisting of NiP, Ni$_3$P, Ta, W, W-alloys, Mo and Mo-alloys.

11. The magnetic recording medium according to claim 10, wherein the seed layer has a thickness of about 200 Å to about 2000 Å.

12. The magnetic recording medium according to claim 2, wherein the underlayer comprises Cr, CrV, or CrTi.

13. The magnetic recording medium according to claim 2, wherein the magnetic layer comprises a Co-based alloy.

14. The magnetic recording medium according to claim 13, wherein the Co-based alloy is selected from the group consisting of CoCr, CoCrTa, CoNiCr, CoCrPtTa, CoCrPt, CoNiPt, CoNiCrPt and CoCrPtB.

15. The magnetic recording medium according to claim 1, further comprising a protective overcoat on the magnetic layer.

16. A magnetic recording medium comprising:

a substrate comprising a glass or glass-ceramic material;

a seed layer on the substrate, said seed layer having a roughened upper surface;

an underlayer on the roughened upper surface of the seed layer; and a magnetic layer on the underlayer; wherein the roughness of the seed layer surface has a peak-to-peak amplitude of about 5 Å to about 100 Å and a wavelength of about 5 Å to about 100 Å.

17. The magnetic recording medium according to claim 16, wherein the roughness of the seed layer surface has a peak-to-peak amplitude of about 5 Å to about 50 Å and a wavelength of about 5 Å to about 50 Å.

18. The magnetic recording medium according to claim 16, wherein upper surface of the seed layer is oxidized.

19. The magnetic recording medium according to claim 18, wherein the microstructure of the magnetic layer comprises less than about 50% bicrystal clusters.

20. The magnetic recording medium according to claim 19, wherein the seed layer comprises NiP.

21. The magnetic recording medium according to claim 19, wherein the magnetic layer comprises a cobalt-based alloy.

22. The magnetic recording medium according to claim 21, wherein the cobalt-based alloy is selected from the group consisting of Co-Cr-Ta, Co-Cr-Pt-Ta, Co-Cr-Pt. Co-Ni-Cr, and Co-Cr-Pt-B.

23. A method of manufacturing a magnetic recording medium, which method comprises:

depositing a seed layer on a substrate comprising a glass or glass-ceramic material;

roughening the surface of the seed layer;

depositing an underlayer on the roughened surface of the seed layer so that the underlayer has an average grain size less than about 20 nm.

24. The method according to claim 23, comprising:

sputter depositing the seed layer; and oxidizing the surface of the seed layer to roughen the seed layer surface.

25. The method according to claim 24, comprising heating the sputter deposited seed layer above about 25° C. in the presence of oxygen to oxidize the seed layer surface.

26. The method according to claim 25, comprising:

preheating the substrate to a temperature above about 25° C.; and sputter depositing the seed layer on the heated substrate.

27. The method according to claim 26, comprising:

sputter depositing the seed layer on the heated substrate in an argon containing atmosphere; and exposing the heated sputter deposited seed layer on the heated substrate to an atmosphere containing about 1% to about 100% oxygen to roughen the seed layer surface.

28. The method according to claim 27, comprising:

controlling the substrate temperature, amount of oxygen and duration of oxidation so that the seed layer has an upper surface roughness with a peak-to-peak amplitude of about 5 Å to about 100 Å and a wavelength of about 5 Å to about 100 Å.

29. The method according to claim 28, comprising controlling the substrate temperature, amount of oxygen and duration of oxidation so that the seed layer has a surface roughness with a peak-to-peak amplitude of about 5 Å to about 50 Å and a wavelength of about 5 Å to about 50 Å.

30. The method according to claim 23, comprising sputter depositing the underlayer.

31. The method according to claim 23, comprising sputter depositing and epitaxially growing the magnetic layer with a microstructure comprising less than about 50% bicrystal clusters.

32. The method according to claim 31, wherein the magnetic layer has a microstructure comprising less than about 25% bicrystal clusters.

33. The method according to claim 23, wherein the magnetic layer has an average grain size less than about 15 nm.

34. The method according to claim 23, comprising sputter depositing a seed layer containing a material selected from the group consisting of Ni$_3$P, NiP, Ta, W, W-alloys, Mo and Mo-alloys.

35. The method according to claim 23, comprising sputter depositing a magnetic layer comprising a Co-based alloy.

36. The method according to claim 35, wherein the Co-based alloy is selected from the group consisting of CoCr, CoCrTa, CoNiCr, CoCrPtTa, CoCrPt, CoNiPt, CoNiCrPt and CoCrPtB.

37. A method of manufacturing a magnetic recording medium, which method comprises:

depositing seed layer on a substrate comprising a glass or glass-ceramic material;

roughening a surface of the seed layer so that the surface roughness has a peak-to-peak amplitude of about 5 Å to about 100 Å and a wavelength of about 5 Å to about 100 Å;

depositing an underlayer on the roughened surface of the seed layer; and depositing a magnetic layer on the underlayer.

38. The method according to claim 37, wherein the seed layer has a surface roughness with a peak-to-peak amplitude of about 5 Å to about 50 Å and a wavelength of about 5 Å to about 50 Å.

39. The method according to claim 38, wherein the surface of the seed layer is roughened by oxidation.

40. The method according to claim 39, comprising:

sputter depositing the seed layer;

oxidizing the surface of the seed layer;

sputter depositing the underlayer on the oxidized surface of the seed layer; and depositing the magnetic layer on the underlayer, wherein the microstructure of the magnetic layer comprises less than about 50% bicrystal clusters.

41. A magnetic recording medium comprising:

a substrate comprising a glass or a glass-ceramic material;

a seed layer, having a roughened surface, on the substrate, wherein the roughness of the seed layer surface has a peak-to-peak amplitude of about 5 Å to about 100 Å and a wavelength of about 5 Å to about 100 Å;

an underlayer on the roughened upper surface of the seed layer, the underlayer having an average grain size less than about 20 nm; and a magnetic layer on the underlayer, the magnetic layer having an average grain size less than about 15 nm and a microstructure comprising less than about 50% bicrystal clusters.

42. A method of manufacturing a magnetic recording medium, which method comprises:

depositing a seed layer on a substrate comprising a glass or glass-ceramic material;

roughening the surface of the seed layer, so that the seed layer has an upper surface roughness with a peak-to-peak amplitude of about 5 Å to about 100 Å and a wavelength of about 5 Å to about 100 Å;

depositing an underlayer on the roughened surface of the seed layer so that the underlayer has an average grain size less than about 20 nm; and depositing and epitaxially growing on the underlayer a magnetic layer having an average grain size less than about 15 nm and a microstructure comprising less than about 50% bicrystal clusters.

43. The method according to claim 23, comprising controlling the roughening of the surface of the seed layer so that the deposited underlayer has an average grain size less than about 20 nm.

44. The method according to claim 42, comprising controlling the roughening of the surface of the seed layer so that the deposited underlayer has an average grain size less than about 20 nm.

* * * * *